March 15, 1966     N. E. DOYLE     3,240,517
FAN HUB
Filed March 12, 1963
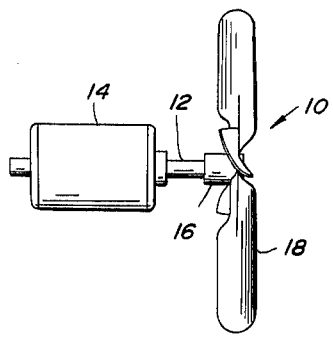
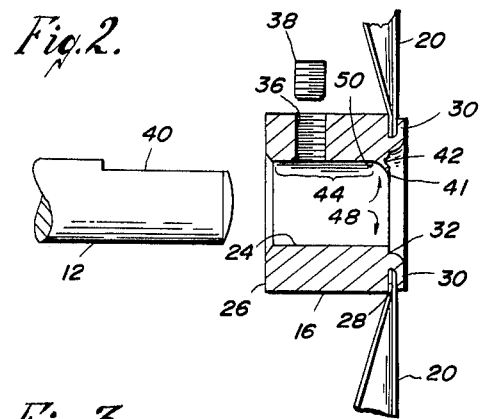
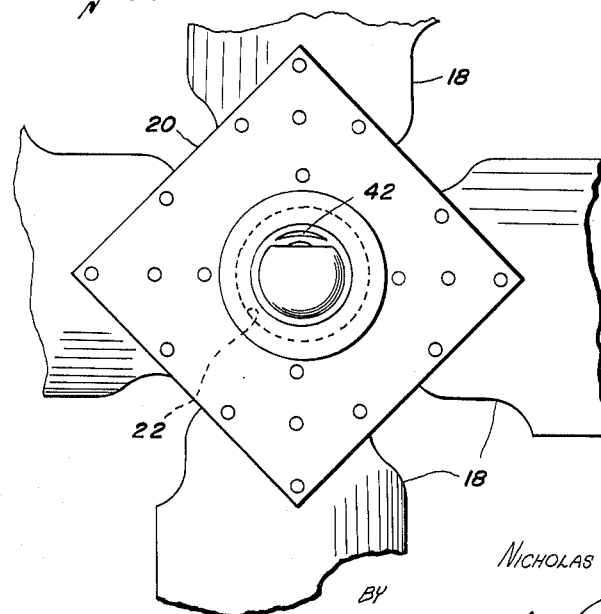
INVENTOR.
NICHOLAS E. DOYLE
BY
*McCormick, Paulding & Huber*
ATTORNEYS United States Patent Office 3,240,517
Patented Mar. 15, 1966

1

3,240,517
FAN HUB
Nicholas E. Doyle, Torrington, Conn., assignor to The Torrington Manufacturing Company, Torrington, Conn., a corporation of Connecticut
Filed Mar. 12, 1963, Ser. No. 264,501
2 Claims. (Cl. 287—53)

This invention relates to rotary air moving equipment and more particularly to an improved hub construction to facilitate the mating of a hub and a shaft at assembly.

The general object of this invention is to provide an improved hub for quick assembly with existing shafts.

A more specific object of the invention is to provide a hub for use with shafts having a conventional flat surface engageable with a set screw or the like and which hub is so constructed that the set screw can be easily aligned with the flat of the shaft at assembly.

Another specific object of the invention is to provide a hub which is relatively inexpensive to manufacture and which can be assembled with a shaft more quickly than conventional hubs.

The drawing shows a particular embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 shows a fan incorporating the present invention.

FIG. 2 is a sectional side view of the hub of the FIG. 1 device drawn to slightly larger scale and showing a shaft and a set screw in exploded relation thereto.

FIG. 3 is an end view of the device of FIG. 2.

Referring to the drawing, there is illustrated an exemplary application of the present invention in the assembly of a fan to a rotatable shaft. Although a fan assembly is shown the invention is not so limited but is equally applicable to a centrifugal blower wheel or other such structure which must be securely attached to a rotatable shaft.

FIG. 1 shows a fan assembly 10 mounted on a rotatable shaft 12 which is driven by an electric motor 14. The fan assembly is made up of a hub 16 which supports various fan blades 18, 18. As best shown in FIG. 3 these blades are riveted to a square plate 20 which has an aperture 22 therein to accommodate the hub 16.

The cylindrical hub 16 shown in section in FIG. 2, has a generally cylindrical bore 24 extending longitudinally thereof from an inner end 26 to an outer end 28. The inner end 26 is symmetrically champhered around the bore 24 to facilitate engagement of the fan assembly with the shaft 12. The outer end 28 is provided initially with an annular flange 30 surrounding the bore 24, the outer diameter of which flange is adapted to receive the fan assembly 10 by the aperture 22. The annular flange 30 initially projects axially outwardly from the end 28 of the hub 10. When the hub and fan assembly are mated, the projecting flange is spun over to the position shown in FIG. 2, the hub and fan assembly being thus rigidly connected one to the other.

As shown, the annular flange 30 is not only stepped radially inwardly from the outside diameter of the cylindrical hub 16, but it is preferably stepped radially outwardly from the inside diameter of the hub bore 24 for a purpose to be set forth hereinbelow.

A conventional set screw opening 36 is provided in the annular wall of the fan hub 16. A set screw 38 is threadably received in said opening 36 and when the shaft 12 is inserted in the bore 24 the screw 38 is adapted to contact a flat 40 on said shaft whereby the fan hub may be rigidly connected to its shaft.

It will be apparent that upon mounting the hub 16 on the shaft 12 the set screw opening 36 mush be accurately aligned with the flat 40 on said shaft before the set screw can be tightened properly. If the set screw is only slightly angled with respect to a line normal to the flat 40, then although the screw be adequately tightened with the prescribed torque, the hub will not be properly secured to the shaft and may loosen when an air load is subsequently applied by the fan to the hub. Heretofore, the method of assembling these parts has involved the time consuming process of oscillating the fan and simultaneously holding the shaft from rotating while the set screw is tightened. The fan hub of the present invention eliminates this relatively costly step in the assembly of rotary air moving equipment.

To realize the benefits accruing from the present invention in a hub which can be inexpensively produced the aforementioned annular flange 30 defines a step 32 between its inside diameter and the diameter of the bore 24. Said step provides a generally radial surface and before mounting the fan assembly 10 on the shaft 12, the said surface is upset by a chisel point punch or the like at a particular circumferential location 42 which is longitudinally or axially aligned with the set screw opening 36. As shown in FIG. 2 the indentation so made causes a projection 41 of the hub material which extends radially inwardly with respect to the bore center line. As a result of this manner of forming this projection at least two desirable characteristics are achieved. First, a hub of the present invention is inexpensive to manufacture. Secondly, the projection so formed extends only a very short distance along said bore whereby the weight of the associated fan structure can be supported by a shaft received in an inner portion 44 of the bore. With the fan structure so supported it can be conveniently rotated with respect to the hub to complete assembly.

It will be apparent that the resulting hub has an inner portion 44 of its bore 22 which is circular in cross section so as to receive the shaft 12 in any angular position with respect to the hub 16. An outer end portion 48 of said bore departs from the circular cross section at the location 42 and defines a shaft alignment means in the form of the projection 41 so as to permit the shaft 12 to enter the same only when the hub 16 and shaft 12 are in the desired angular relationship. Thus, the flat 40 on the shaft 12 must be aligned with the set screw opening 36 before the fan hub can be completely assembled.

Finally, from an inspection of the shape of the projection, in the view of FIG. 2, another advantage to the present invention will appear. The radial thickness of this projection tapers along its length from an inner point 50 where it has zero thickness and the bore 24 is circular in cross section, to the outer end where the thickness thereof corresponds to the standard depth of the flat 40 on the size shaft 12 used in a particular application. By so tapering this projection 42 it should be apparent that the mating of the fan hub 16 with its associated shaft 12 is greatly facilitated.

The invention claimed is:

1. A hub for connecting a rotary air moving structure with a shaft which has a flat portion extending from one end thereof and engageable with a set screw or the like, said hub having a generally cylindrical bore therein which extends therethrough from one end to another, said bore being circular in cross section so as to receive said shaft in any angular relation, one end of said hub having an annular counterbore contiguous with and surrounding the cylindrical bore at that end so as to define an annular substantially radial surface around said bore, a portion of said annular radial surface around said bore being upset and deformed radially inwardly and forming substantially a chord of said cylindrical bore so as to provide a shaft alignment projection means within the confines of said counterbore which projection means extends radially inwardly with respect to the bore center line a distance approximately to the radial depth of the flat on said shaft, said hub also having a radial bore which is threaded and oriented generally perpendicularly with respect to the longitudinal center line of said cylindrical bore and intersecting said cylindrical bore, and said radial bore being axially spaced from and longitudinally aligned with said shaft alignment means so that a plane projected from the axis of said cylindrical bore to the surface of the hub intersects and is substantially normal to said chord and includes and is parallel to the axis of said radial bore, whereby a set screw received in said threaded bore must engage the flat of a shaft received in the bore of said hub.

2. A hub as set forth in claim 1 wherein said projection means tapers in the radial direction from a minimum dimension at its inner end to a maximum dimension at its outer end, the radial extent of said maximum dimension corresponding at least approximately to the radial depth of the flat on the shaft.

References Cited by the Examiner
UNITED STATES PATENTS

| | | | |
|---|---|---|---|
| 494,814 | 4/1893 | Kohl | 287—52.01 |
| 645,977 | 3/1900 | Shields. | |
| 1,332,898 | 3/1920 | Hossie et al. | 287—53 X |
| 2,144,860 | 1/1939 | Thorp | 170—173 X |
| 2,334,456 | 11/1943 | Thorp | 170—173 X |
| 2,491,356 | 12/1949 | Anderson. | |
| 2,554,311 | 5/1951 | Place | 170—160.54 |
| 2,559,831 | 7/1951 | Roffy | 170—173 |
| 2,629,616 | 2/1953 | McVey | 287—52.08 |
| 2,853,013 | 9/1958 | Lung | 287—53 X |
| 3,004,362 | 10/1961 | Day | 287—53 X |

EDWARD C. ALLEN, *Primary Examiner.*

CARL W. TOMLIN, THOMAS F. CALLAGHAN,
*Examiners.*